(12) United States Patent
Lipshitz et al.

(10) Patent No.: US 8,417,198 B1
(45) Date of Patent: Apr. 9, 2013

(54) SELECTION OF CLOSED-LOOP/OPEN-LOOP POWER CONTROL IN USER EQUIPMENT

(75) Inventors: David Lipshitz, Ra'anana (IL);
Alexander Zaslavsky, Petach Tikva (IL)

(73) Assignee: Marvell International Ltd., Hamilton (BM)

( * ) Notice: Subject to any disclaimer, the term of this patent is extended or adjusted under 35 U.S.C. 154(b) by 352 days.

(21) Appl. No.: 12/814,456

(22) Filed: Jun. 13, 2010

Related U.S. Application Data

(60) Provisional application No. 61/255,815, filed on Oct. 28, 2009, provisional application No. 61/303,539, filed on Feb. 11, 2010.

(51) Int. Cl.
*H01Q 11/12* (2006.01)
*H04B 1/04* (2006.01)

(52) U.S. Cl. ............ 455/127.1; 455/126; 455/522

(58) Field of Classification Search ............ 455/126, 455/127.1, 127.2, 127.4, 522
See application file for complete search history.

(56) References Cited

U.S. PATENT DOCUMENTS

| | | | |
|---|---|---|---|
| 6,236,863 B1 * | 5/2001 | Waldroup et al. ............ 455/522 |
| 6,498,785 B1 | 12/2002 | Derryberry et al. |
| 6,735,420 B2 | 5/2004 | Baldwin |
| 6,788,138 B2 * | 9/2004 | Suzuki ............ 330/129 |
| 7,421,255 B2 | 9/2008 | Inamori et al. |
| 7,532,680 B2 * | 5/2009 | Vayrynen et al. ............ 375/295 |
| 7,724,086 B2 * | 5/2010 | Camuffo et al. ............ 330/129 |
| 7,747,227 B2 | 6/2010 | Fukuda |
| 7,805,116 B2 * | 9/2010 | Xu et al. ............ 455/127.2 |
| 7,974,596 B2 * | 7/2011 | Lim et al. ............ 455/126 |
| 7,977,947 B1 | 7/2011 | Jones et al. |
| 7,991,367 B2 * | 8/2011 | Pratt et al. ............ 455/114.3 |
| 8,095,166 B2 * | 1/2012 | Sampath et al. ............ 455/522 |
| 8,249,531 B2 * | 8/2012 | Xu et al. ............ 455/127.1 |
| 2005/0227646 A1 | 10/2005 | Yamazaki et al. |
| 2006/0240784 A1 | 10/2006 | Naguib et al. |
| 2006/0270367 A1 | 11/2006 | Burgener et al. |
| 2007/0243838 A1 | 10/2007 | Lang |
| 2007/0270174 A1 | 11/2007 | Helnonen et al. |
| 2008/0220806 A1 * | 9/2008 | Shin et al. ............ 455/522 |
| 2009/0111399 A1 | 4/2009 | Norris et al. |
| 2009/0163155 A1 | 6/2009 | Camuffo et al. |
| 2010/0008410 A1 * | 1/2010 | Shute et al. ............ 375/221 |
| 2010/0029226 A1 | 2/2010 | Visser |
| 2010/0311474 A1 * | 12/2010 | Donovan et al. ............ 455/574 |

OTHER PUBLICATIONS

3GPP TS 25.101 "Technical Specification Group Radio Access Network; User Equipment (UE) Radio Transmission and Reception (FDD)", Release 8, version 8.5.1, Jan. 2009.

(Continued)

*Primary Examiner* — Duc M Nguyen

(57) ABSTRACT

A method for power control, including determining a need in a transmitter to perform a first output power update and then a second output power update. The method includes selecting a control mode for the first output power update and a control mode for the second output power update prior to performing the first output power update. The control modes are selected from a closed loop mode and an open loop mode, and the selection is based on a function of a current output power, a power to be applied at the first output power update, and a power to be applied at the second output power update. The method includes performing the first output power update using the first control mode, and then performing the second output power update using the second control mode, without measuring a power level applied responsively to performing the first output power update.

20 Claims, 6 Drawing Sheets

OTHER PUBLICATIONS

3GPP TS 34.121 "Technical Specification Group Radio Access Network; Terminal Conformance Specification; Radio Transmission and Reception (FDD)", Release 6, version 6.4.0, Mar. 2006.
Lipshitz et al., U.S. Appl. No. 12/771,212 "High-Accuracy Transmit Power Control With High-Efficiency Power Amplifier Operation", filed May 2, 2010.
Lipshitz et al., U.S. Appl. No. 12/771,211 "Setting of Power Amplifier Control Voltage", filed May 2, 2010.
U.S. Appl. No. 12/772,211 Official Action dated Sep. 28, 2011.
U.S. Appl. No. 12/772,211 Official Action dated Feb. 17, 2012.
U.S. Appl. No. 13/587,231 Office action dated Nov. 28, 2012.
U.S. Appl. No. 12/722,211 Office action dated Dec. 6, 2012.

* cited by examiner

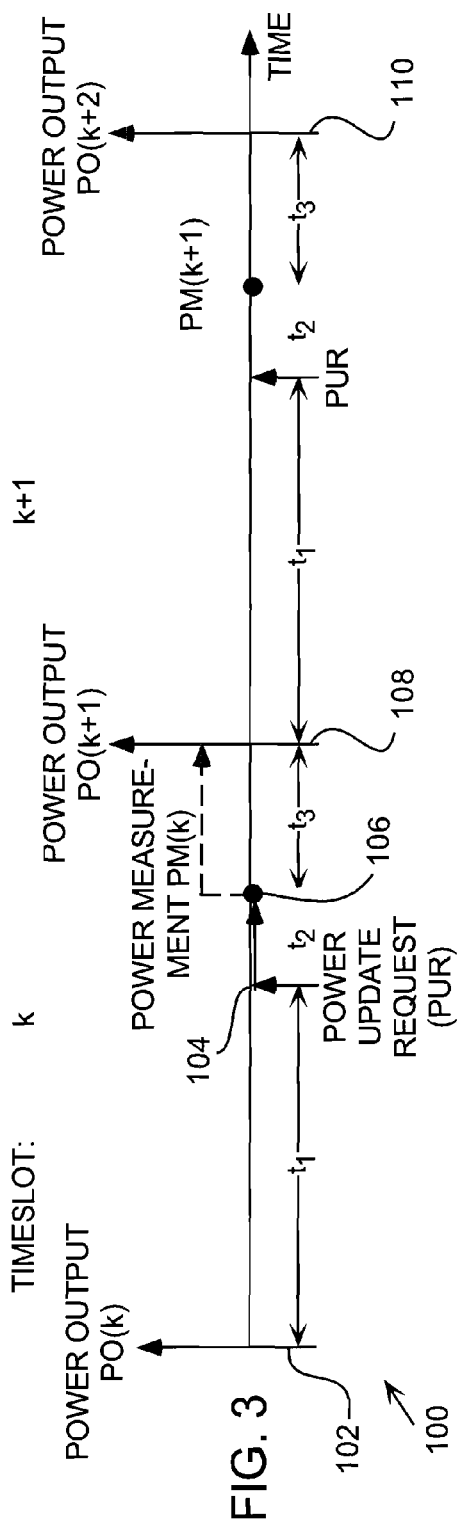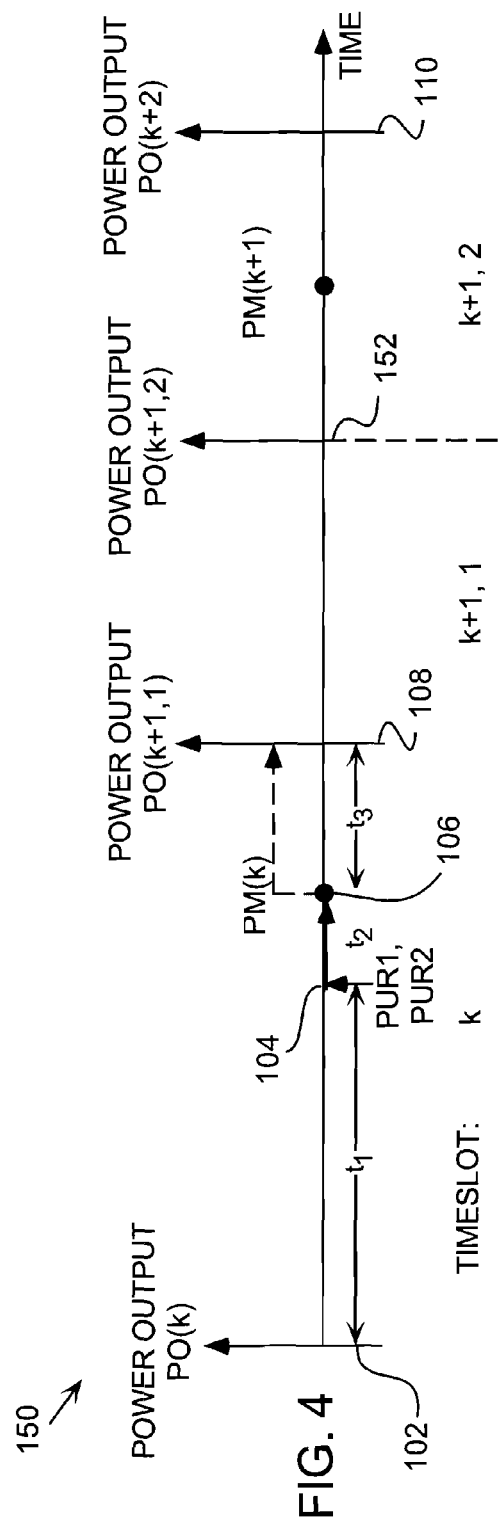

SELECTION OF CLOSED-LOOP/OPEN-LOOP POWER CONTROL IN USER EQUIPMENT

CROSS-REFERENCE TO RELATED APPLICATIONS

This application claims the benefit of U.S. Provisional Patent Applications 61/303,539 filed Feb. 11, 2010, and 61/255,815 filed Oct. 28, 2009, both of which are incorporated herein by reference.

FIELD OF THE DISCLOSURE

The present disclosure relates generally to operation of mobile user equipment on a cellular network, and specifically to functioning of the transmitter of the equipment.

BACKGROUND OF THE DISCLOSURE

User equipment operating in a cellular network operates according to standards agreed to by various network operators and equipment vendors. The standards typically define acceptable tolerances for the functioning of a transmitter of the equipment. The transmitter is typically configured to operate in an open loop mode for power control, or in a closed loop mode for power control, for maximum efficiency, and the transmitter should operate within these tolerance requirements defined by the standards when operating in either mode. As an example, a 3GPP ($3^{rd}$ Generation Partnership Project) standard sets the requirements for the control behavior.

The description above is presented as a general overview of related art in this field and should not be construed as an admission that any of the information it contains constitutes prior art against the present patent application.

SUMMARY OF THE DISCLOSURE

An embodiment of the present disclosure provides a method for power control, including determining a need in a transmitter to perform a first output power update and then a second output power update after the first output power update. The method also includes selecting a first power control mode for the first output power update and a second power control mode for the second output power update prior to performing the first output power update; the first power control mode and second power control mode being selected from one of a closed loop power control mode and an open loop power control mode. The selection of the first power control mode and of the second power control mode is based on a function of a current output power, a first power to be applied at the first output power update, and a second power to be applied at the second output power update. The method further includes performing the first output power update using the first power control mode, and then performing the second output power update using the second power control mode, without measuring a power level applied in response to performing the first output power update.

Typically, the method includes configuring the transmitter to transmit signals in defined timeslots, wherein determining the need includes determining the need in an initial timeslot and dividing a subsequent timeslot into a first interval and a second interval. Configuring the transmitter to operate in the defined timeslots may include defining the timeslots pursuant to a Wideband Code Division Multiple Access (WCDMA) standard.

In one embodiment the method includes configuring the transmitter to transmit at a current power in the first power control mode and to transmit subsequently at the first power in the first power control mode, wherein the current power and the first power meet a transmitter power difference tolerance defined by a Wideband Code Division Multiple Access (WCDMA) standard, and wherein the first power control mode includes one of the closed loop power control mode and the open loop power control mode.

In an alternative embodiment selecting the first power control mode and the second power control mode includes determining that a difference between the first power and the second power is less than a selected threshold, and setting, in response to the difference, the first power control mode and the second power control mode to mutually match each other.

In a further alternative embodiment selecting the first power control mode and the second power control mode includes determining that a difference between the first power and the second power is greater than or equal to a selected threshold, and setting, in response to the difference, the first power control mode and the second power control mode to match.

In a yet further alternative embodiment determining the need includes dividing a power region wherein the transmitter is configured to transmit in the open and closed loop power control modes into power sub-regions, and defining a boundary of one of the sub-regions in response to boundaries of the power region.

In a disclosed embodiment the method includes implementing the function as one or more processes defined by respective one or more predefined flowcharts.

In a further disclosed embodiment the method includes implementing the function as a reference look up table including ordered triples of power outputs in a one to one correspondence with ordered pairs of control modes.

There is further provided, according to an embodiment of the present disclosure, a power control module for a transmitter, including a processing module and a power control mode selector. The processing module is configured to determine a need for the transmitter to perform a first output transmit power update and then perform a second output transmit power update after the first output transmit power update. The power control mode selector is configured to select a first power control mode for the first output transmit power update and select a second power control mode for the second output transmit power update prior to performing the first output power update. The power control mode selector is also configured to select the first power control mode and select the second power control mode from one of a closed loop power control mode and an open loop power control mode. The power control mode selector is further configured to select the first power control mode and the second power control mode respectively based on a function of a current output power of the transmitter, a first power to be applied at the first output power update, and a second power to be applied at the second output power update.

There is yet further provided, according to an embodiment of the present disclosure, user equipment, including a transmitter and the power control module disclosed above.

There is further provided, according to an embodiment of the present disclosure, a transmitter chipset for use in user equipment (UE), including the power control module disclosed above.

The present disclosure will be more fully understood from the following detailed description of the embodiments thereof, taken together with the drawings, in which:

BRIEF DESCRIPTION OF THE DRAWINGS

FIG. 3 is a schematic timing diagram of operations of the user equipment, according to an embodiment of the present disclosure;

FIG. 4 is a schematic timing diagram of alternative operations of the user equipment, according to an embodiment of the present disclosure;

DETAILED DESCRIPTION OF EMBODIMENTS

In embodiments of the present disclosure, a transmitter of user equipment is configured to operate in one of two power control modes: an open power control loop mode or a closed power control loop mode. The transmitter operates in timeslots defined by a cellular network within which the user equipment functions. The transmitter determines that there is a need to perform in one or more upcoming timeslots a first output power update and then a second output power update.

In an embodiment, the upcoming timeslot is divided into two intervals. A first power setting (corresponding to the first power update) is applied to a first interval, and a second power setting (corresponding to the second power update) is applied to a second interval in the upcoming timeslot. The mode, open or closed loop, in which the transmitter operates for each interval is determined in response to a current power output in the current timeslot and the required first and second powers in the upcoming timeslot. The mode is determined without measuring the power level following the application of the first setting.

Figure 1:
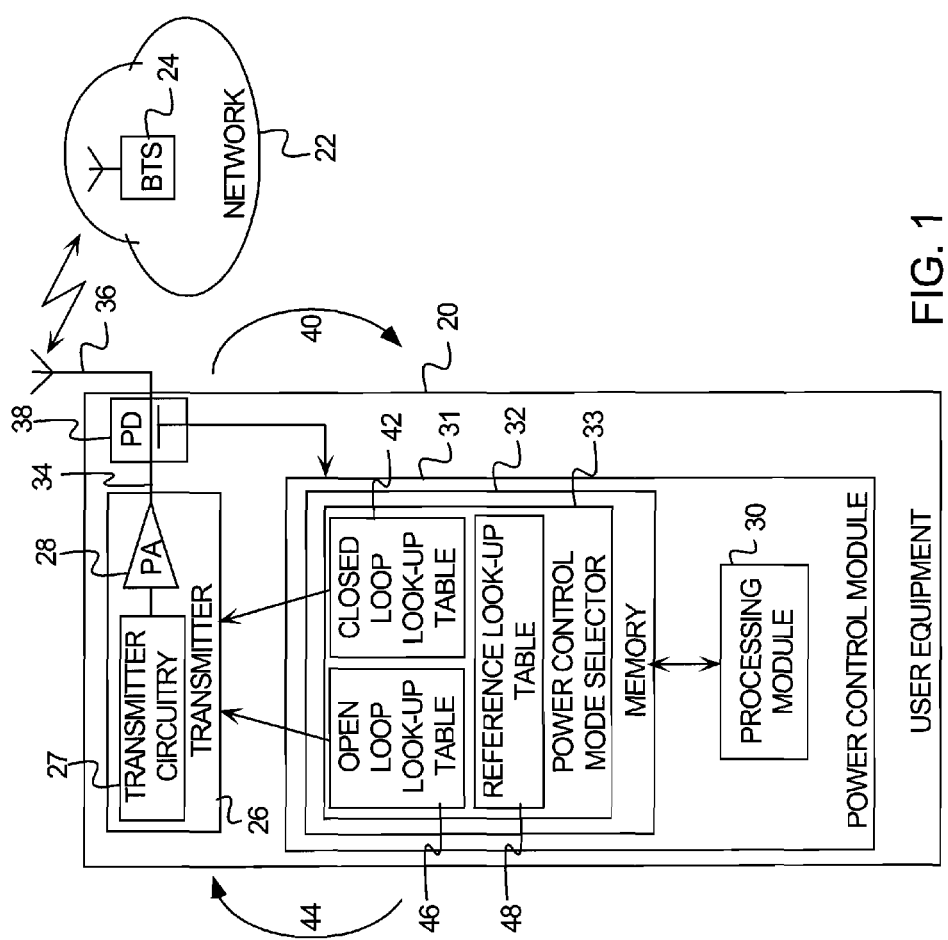
FIG. 1 is a schematic diagram of user equipment, according to an embodiment of the present disclosure.

Reference is now made to FIG. 1, which is a schematic diagram of user equipment (UE) 20, according to an embodiment of the present disclosure. Equipment 20 is typically configured to operate in a cellular telecommunications network 22. By way of example only and for simplicity, network 22 is herein assumed to comprise a WCDMA (Wideband Code Division Multiple Access) network, operating under WCDMA standard promulgated by the 3GPP. The support office of 3GPP is found at Valbonne, FRANCE, and Technical Specification 3GPP TS 25.101 V6.12.0 (2006-06) of the partnership is incorporated herein by reference. However, it is noted that operation of embodiments of the present disclosure are not confined to a specific type of network or to a particular standard, so that network 22, for example, may comprise a TDMA (Time Division Multiple Access) network operating under a GSM (Global Systems Mobile) standard, or may operate under an LTE (Long Terms Evolution) or an LTE Advanced standard.

Network 22 comprises a base transceiver station (BTS) 24, which communicates via electromagnetic (µM) frequencies defined by the operating standard of the network with UE 20. Inter alia, the communication between the base station and the user equipment comprises requests to the user equipment regarding the power level transmitted by the equipment. Typically, the base station attempts to maintain approximately equal power values in an overall power level spectrum of EM power received from all UEs communicating with the base station. The requests from BTS 24 to UE 20, and to other UEs, usually achieve this level received power spectrum at the base station.

UE 20 comprises a transmitter 26 having transmitter circuitry 27 feeding into, as the transmitter's last stage, a power amplifier 28. The transmitter circuitry 27 and the power amplifier 28 are both controlled by a processing module 30 in a UE power control module 31. To set the controls, processing module 30 accesses UE operating software stored in a memory 32, which typically comprises volatile and non-volatile components. In an embodiment, the software used by processing module 30 is downloaded to power control module 31 in electronic form, over a network, for example, or is alternatively supplied to the power control module on non-transitory tangible media, such as on a flash memory card.

The output from amplifier 28 transfers via a conductor 34 to an antenna 36, which acts as a transmitting antenna. A power detector 38, located in proximity to conductor 34, is configured to measure the power transferred to the antenna, and the measurement of the detected power is received by processing module 30. In a closed loop operation mode the processing module uses the power measurement, in a closed negative feedback power control loop mode 40, by adjusting the settings of the transmitter controls to converge the measured power output of power amplifier 28 to a target power detector measurement. Processing module 30 accesses a closed loop look-up table 42 stored in memory 32. Table 42 comprises ordered pairs of desired power outputs and target power detector measurements. It is noted that closed power control loop mode 40 comprises power detector 38, processing module 30, closed loop table 42, and transmitter 26. As is also described in more detail below, closed power control loop mode 40 is not operative at lower output powers of transmitter 26, because the changes registered by the power detector become small for relatively large changes in output power.

Operation in closed power control loop mode 40, comprising use of table 42 by the processing module, typically generates some error in the actual power output by antenna 36, as distinct from a nominal expected output provided by the table. Actual power outputs and respective nominal expected outputs are typically derived by calibrating the transmitter when it operates in the closed power control loop mode. (As described below, the nominal expected output is typically determined in response to a power update request from BTS 24.) The error referred to above for closed loop 40 has a maximum value herein termed MAXCLERROR. For example, MAXCLERROR could be 0.5 dB. In addition to closed feedback loop 40, UE 20 comprises an open power control loop mode 44. Open power control loop mode 44 does not use power detector 38. Rather, in operating the open power control loop mode processing module 30 accesses an open loop table 46, stored in memory 32. Table 46 comprises ordered pairs of desired power outputs and gain settings to be applied to transmitter 26. Open power control loop mode 44 comprises processing module 30, open loop table 46, and transmitter 26. While the open power control loop mode is typically operative over the full range of powers output by the transmitter, open power control loop mode operation is inherently less accurate than closed power control loop mode operation. Consequently, in an embodiment, UE 20 does not support open loop operation for certain power regions in which closed loop operation is possible.

As for closed power control loop mode 40, operation in open power control loop mode 44 usually generates an error between a nominal and an actual power output, and actual power outputs and respective nominal expected outputs are typically derived by calibrating the transmitter when it operates in the open power control loop mode. (The error is typically a function of a number of power levels used to calibrate the transmitter.) The error for open loop 44 has a maximum value herein referred to as MAXOLERROR. For example, MAXOLERROR could be 1.5 dB.

The closed loop table and the open loop table are typically stored as part of a power control mode selector 33 in memory 32 on production of UE 20, and entries in the tables are used to define the operating regions of the two loops. Power control mode selector 33 selects in which mode, the closed power control loop mode or the open power control loop mode, the transmitter is to operate. The functions of selector 33 are described in more detail with respect to FIGS. 8 and 9 below.

In the description hereinbelow, closed power control loop mode 40 of operation is also referred to as closed loop 40, and open power control loop mode 44 of operation is also referred to as open loop 44.

In some embodiments, a reference look up table 48 is also stored in power control mode selector 33. The function of the reference look up table is described below.

In an embodiment, processing module 30 and power control mode selector 33 are provided as a transmitter chipset comprising one or more electronic devices which are installed in UE 20.

Figure 2:
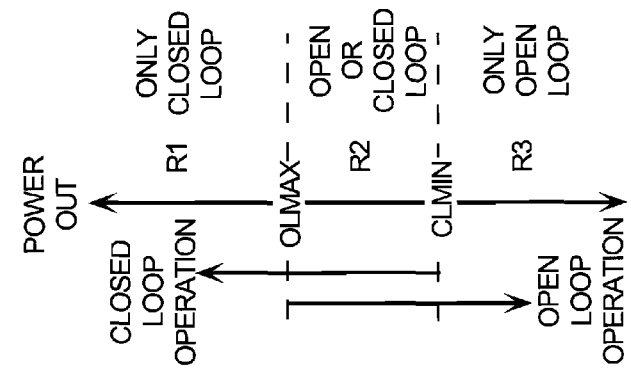
FIG. 2 is a power level diagram, according to an embodiment of the present disclosure.

FIG. 2 is a power level diagram, according to an embodiment of the present disclosure. The power level diagram shows output power levels of transmitter 26 in which processing module 30 is configured to selectively operate either closed loop 40 or open loop 44 modes.

Closed loop 40 is configured to be operative when power output levels of the transmitter are greater than a closed loop minimum operating value CLMIN. The presence of a minimum value for closed loop operation, CLMIN, is typically a consequence of the poor operating characteristics of power detector 38, since, in an embodiment, at low power levels, e.g., below CLMIN, the detector is relatively inaccurate.

Below CLMIN, where the closed loop is inoperative, open loop 44 is configured to be operative. In addition, the open loop is typically also configured to be operative at power levels greater than CLMIN, up to an open loop maximum operating value OLMAX.

The output power levels for transmitter 26 are thus divided into three regions R1, R2, and R3. Table I provides a definition and properties for these regions. In an embodiment, the power levels defining the different regions are derived from the physical characteristics of the transmit chain, specifically power amplifier 28 and power detector 38.

TABLE I

| Power Region | Region Definition in terms of power P (dBm) | Region Property |
|---|---|---|
| R1 | P > OLMAX | Only closed loop operation. |
| R2 | CLMIN ≦ P ≦ OLMAX | Closed loop or open loop operation |
| R3 | P < CLMIN | Only open loop operation. |

As seen in FIG. 2 and Table I, there is an overlap region R2 where processing module 30 may operate the transmitter using either the open loop or the closed loop. Thus, in the overlap region, there are valid entries for powers in closed loop table 42 and in open loop table 46. In region R1 there are only valid entries for powers in the closed loop table, and no entries for powers in region R1 in the open loop table. In region R3 there are only valid power entries in the open loop table, and no entries for powers in region R3 in the closed loop table.

Transmitter 26 transmits at a power level based on entries in closed loop table 42 or open loop table 46, the entries providing voltage or gain controls for the transmitter. However, there may be misalignment issues, e.g. the voltage or gain controls may result in different output power levels when reading from the closed loop table as compared to the open loop table.

The valid entries for both tables for the overlap region allows the tables to be aligned in this region. Providing an overlap region wherein either loop could operate facilitates the processing module switching between closed and open loop operation by allowing alignment between the two tables, which aligns the two loops.

The difference between the actual transmitted power after performing a power update and the actual transmitted power before performing the power update is known as a power step. The power step error is the difference between the required transmitted power after the power update and the actual transmitted power after the power update.

Alignment between the two tables, i.e., between the two loops, reduces the possible power step error, since after alignment has been performed the power step error is the power step error of the closed loop if the alignment causes a switch to closed loop operation if the alignment causes a switch to closed loop operation, or is the power step error of the open loop if the alignment causes a switch to open loop operation. If no alignment occurs then the maximum error is the sum of the two absolute loop errors, i.e., MAXOLERROR+MAXCLERROR.

Typically, network operating standards specify the transmitter power step tolerance, where the larger the change in power between successive cycles the larger the permissible tolerance. The power step error of the closed loop and the power step error of the open loop must meet the standard's power step tolerance for all required power steps over each loop's operating power range. Switching between the two loops shall only be performed with no alignment for sufficiently large power updates, i.e., when the allowed power step tolerance is greater than MAXOLERROR+MAXCLERROR.

The process of alignment is also referred to with reference to the timing diagrams of FIG. 3 and FIG. 4 below.

In defining region R2, for a given value of CLMIN, the value of OLMAX is typically selected to allow a valid power output transition between regions R1 and R3. In other words, the value of OLMAX is typically selected so that power level errors introduced by a transition from R1 to R3, or from R3 to R1, are, as explained above, within errors allowed by the network operating standard. Alignment between the two loops is not possible for such transitions, so that if a loop switch occurs, the possible error in the power step after the switch is MAXOLERROR+MAXCLERROR.

In an embodiment of the present disclosure, CLMIN=0 dBm, and OLMAX=14 dBm. Acceptable tolerances for different power changes in a given transition are typically defined in the operating standard of network 22 in terms of a maximum error in the changed power output. For the WCDMA standard of 3GPP, the most stringent transmitter power step tolerance for a nominal power change of 14 dBm is 3 dB. Thus, assuming the values of 0.5 dB for MAXCLERROR and 1.5 dB for MAXOLERROR given above, a loop switch engendering a possible error of MAXOLERROR+ MAXCLERROR is possible.

Typically transmitter 26 is configured to transmit powers between approximately −60 dBm and approximately +30 dBm.

FIG. 3 is a schematic timing diagram 100 illustrating operations of UE 20, according to an embodiment of the present disclosure. Network 22 and the UEs in the network typically operate on the basis of timeslots, i.e., sequential intervals of time within each one of which functions of the network and the UEs repeat according to the operating standard of the network. For example, the 3GPP standard referred to above specifies timeslots having a time interval of approximately 667 μs. To synchronize with BTS 24, UE 20 searches for a synchronization code identifying a synchronization channel; the code is transmitted by BTS 24 once every timeslot.

At a beginning 102 of a first timeslot k (k being a positive integer), processing module 30 configures the transmitter to transmit at a nominal power output PO(k). The configuration may be by the processing module operating the transmitter in closed loop 40, in which case the processing module uses table 42 to set the nominal output power, or in open loop 44, in which case the processing module uses table 46 to set the nominal output power. Power PO(k) is transmitted for the duration of the timeslot. During the timeslot, after an interval $t_1$ from the beginning of the timeslot, processing module 30 receives a power update request (PUR), at a time 104, to update the transmitted power to an output power $PO_{PUR}$. (The requests described herein could typically be in the form of positive or negative power increments that UE 20 is to apply to an existing power output. Herein for simplicity, rather than power increments, the description assumes a request corresponds to an actual power to be output.) The request is typically from BTS 24, although in some embodiments another entity, such as an internal element of UE 20, generates the PUR.

At a time 106, after an interval $t_2$ from time 104, the processing module makes a power measurement PM(k). The power measurement includes both the transmitter 26 gain settings and the detected power made using power detector 38. (The power measurement may be performed earlier than time 104 in slot k and is presented in FIG. 3 to explain the power update flow). A subsequent interval $t_3$ completes at a timeslot boundary 108. Depending on the requested update, during interval $t_3$, the processing module decides to apply either open loop table 46 (for operation in open loop 44) or closed loop table 42 (for operation in closed loop 40) for setting a power output PO(k+1) to be nominally equal to $PO_{PUR}$. PO(k+1), herein referred to as the nominal power output, begins to transmit at boundary 108.

In timeslot k the transmitter operates in one of three power regions R1, R2, or R3 (FIG. 2). Similarly, the transmitter operates in regions R1, R2, or R3 in timeslot k+1. There are thus nine possible power region transitions in passing from timeslot k to timeslot k+1. In interval $t_3$ (FIG. 3) the processing module decides, for each of the transitions, whether the transmitter is to operate in the closed or open loop configuration in timeslot k+1. The decision is made, for example, according to Table II:

TABLE II

| Output Power Region for Timeslot k + 1 | Loop used in Timeslot k + 1 |
|---|---|
| R1 | Closed loop |
| R2 | Closed Loop, unless operation in timeslot k is in R3, in which case: Open Loop |
| R3 | Open Loop |

The decisions for regions R1 and R3 in Table II correspond to the loops which operate for these regions, listed in Table I.

The decision for region R2 in timeslot k+1 is made on the following basis:

a) Other factors being equal, it is better to operate using the closed loop since closed loop operation is inherently more accurate than open loop operation. Thus, except for the case described in b), operation in R2 uses the closed loop.

If in timeslot k operation is in region R3 (and thus uses the open loop configuration) no alignment is possible. Since a non-aligned switch to closed loop operation introduces a greater possible power step error, MAXOLERROR+ MAXCLERROR, than continued operation in the open loop configuration, operation in timeslot k+1 in region R2 continues as open loop.

The description above describes a situation where a power output update is made at timeslot boundary 108. A similar update, to generate PO(k+2), is typically made at a timeslot boundary 110, using a PUR received and a PM made in timeslot k+1.

Consideration of the above description leads to a classification of power output transitions as shown in Table III.

TABLE III

| Transition | Transition property, when transferring from timeslot k to timeslot k + 1 |
|---|---|
| Transition A | No switch in loop used between an initial power region and a final power region, so no power alignment required. |
| Transition B | Switch in loop used between initial and final power regions, with prior power alignment between loops. |
| Transition C | Switch in loop used between initial and final power regions, with no prior power alignment between loops. |

Herein transitions A and B are referred to as aligned transitions; transitions C are referred to as non-aligned transitions. Loop alignment is achieved by aligning the actual output power to the nominal output power of the selected loop. Transmitter 26 gain settings and open loop lookup table 46 are used for alignment to open loop 44. Detected power using power detector 38 and closed loop look-up table 42 are used for alignment to closed loop 40.

FIG. 3 illustrates a situation where one PUR is received in a timeslot, so that in response processing module 30 implements one power level transition, i.e., one power update. The one power update is implemented following a power measurement, at timeslot boundary 108.

FIG. 4 is a schematic timing diagram 150 illustrating an alternative operation of UE 20, according to an embodiment of the present disclosure. Apart from the differences described below, the functions described in diagram 150 are generally similar to that of diagram 100 (FIG. 3), and elements indicated by the same reference numerals in both diagrams 100 and 150 are generally similar in function.

Unlike the timing diagram of FIG. 3, diagram 150 illustrates a situation where UE 20 receives two PURs, PUR1 and PUR2, in timeslot k, approximately at time 104. The two PURs are assumed to respectively request updated transmitter output powers of P1 and P2. In timeslot k the power output by UE 20, PO(k), is also termed P0.

In response to receiving the two PURs, processing module 30 assumes that timeslot k+1 is divided into two sequential time intervals: a first interval (k+1, 1) followed by a second interval (k+1, 2). Intervals (k+1, 1) and (k+1, 2) are also referred to herein respectively as slots (k+1, 1) and (k+1, 2). The two intervals have a dividing boundary 152, which by way of example is assumed to be in the middle of timeslot k+1, although dividing boundary 152 may be at other locations within timeslot k+1. At the beginning of first interval (k+1, 1), processing module 30 sets transmitter 26 to transmit a power output PO(k+1, 1), nominally equal to P1, during the interval. At the beginning of second interval (k+1, 2), the processing module sets the transmitter to transmit a power output PO(k+1, 2), nominally equal to P2, during the second interval.

As is apparent from diagram 150, no power measurement is made during the first interval, during which the transmitter transmits according to the first power update request. In other words, P2 is set for interval (k+1, 2) without reliance on a power measurement having been performed during the immediately preceding interval, (k+1, 1).

Figure 5:
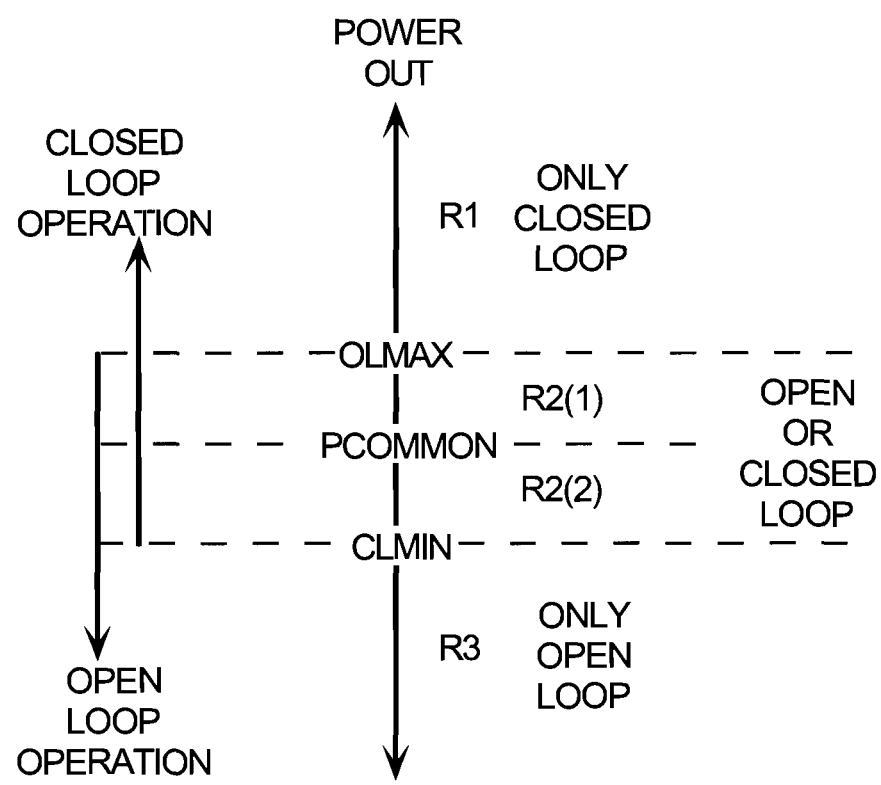
FIG. 5 is an alternative power level diagram, according to an embodiment of the present disclosure.

FIG. 5 is an alternative power level diagram, according to an embodiment of the present disclosure. The power level diagram of the figure applies for the case of two power update requests received in a single timeslot, as described above with reference to FIG. 4. As shown in FIG. 5, in addition to assuming that timeslot k+1 is divided into two intervals, the processing module also assumes that power region R2 is subdivided into two sub-regions, herein referred to as R2(1) and R2(2). Sub-regions R2(1) and R2(2) have a common power boundary, between CLMIN and OLMAX, herein termed PCOMMON, and Table IV below replaces Table I.

TABLE IV

| Power Region | Region Definition in terms of power P (dBm) | Region Property |
|---|---|---|
| R1 | P > OLMAX | Only closed loop operation. |
| R2(1) | OLMAX ≧ P > PCOMMON | Closed loop or |
| R2(2) | PCOMMON ≧ P ≧ CLMIN | open loop operation |
| R3 | P < CLMIN | Only open loop operation. |

In some embodiments PCOMMON is equated to the mean of CLMIN and OLMAX, i.e., $$PCOMMON = \frac{CLMIN + OLMAX}{2} \quad (1)$$

Table IV and FIG. 5 show that in the alternative operations of UE 20 described with respect to FIG. 4 there are four possible power regions: {R1, R2(1), R2(2), R3}. Timing diagram 150 illustrates that each of these four regions is valid during three different time intervals: timeslot(k), interval(k+1, 1), and interval(k+1, 2). There are thus 64 possible "ordered triples" of valid regions for the intervals, of the form (Rx, Ry, Rz), where x, y and z each have the value of 1, 2(1), 2(2) or 3. Each ordered triple defines two power level transitions: a first transition Rx→Ry and a second transition Ry→Rz. Each transition defines a pair of regions, beginning in an initial region and completing in a final region. In addition, each transition is classified according to table III, i.e., as a transition A, a transition B, or a transition C.

For example, the triple (R3, R2(1), R1) indicates that the power output in timeslot k is in region R3, in interval (k+1, 1) is in region R2(1), and in interval (k+1, 2) is in region R1. The triple also defines a first transition R3→R2(1), and a second transition R2(1)→R1. The first transition begins in its initial region R3 and completes in its final region R2(1). The second transition begins in its initial region R2(1) and completes in its final region R1. The description below classifies whether the transitions are A, B, or C type transitions, as defined in Table III.

The loop applicable for each of the power regions R1, R2(1), R2(2) and R3 is defined in Table IV. The decisions for region R2(1) and R2(2) in intervals (k+1, 1) and (k+1, 2) are made using the following conditions:

a A transition A is performed between any pair of regions except between regions R1 and R3.

b A transition B is only performed from regions R2(1) and R2(2), and also only if the transition is a first transition; in other words, the transition occurs across timeslot boundary 108 between timeslot(k) and timeslot(k+1).

c A non-aligned transition, transition C, is only permissible if the power change between the initial region and the end region of the transition is a selected threshold equal to at least the width of one of the regions R2(1) and R2(2).

For the figures given above for CLMIN and OLMAX (0 dBm and 14 dBm), and assuming that equation (1) applies, a transition C is only possible if the power level difference between the initial and final states of a transition is at least 7 dB. The 7 dB difference corresponds to the selected threshold.

d A transition C must be performed for a transition between regions R1 and R3.

Conditions c and d refer to non-aligned transitions. Because the magnitude of the transition is so great, the network operating standard typically permits the transition to be not aligned—even though there may be possibility to perform a measurement.

By using the properties given in Table IV, and applying conditions a, b, c, and d, stated above, unacceptable errors occurring in implementing the transitions and generating a set of 64 possible transitions (depicted in FIG. 6 and FIG. 7 below) are avoided.

Two other conditions are typically also applied. Applying these conditions reduces errors involved, and also simplifies a set of transitions generated.

e If either an aligned transition or a non-aligned transition is possible, the transition performed is normally aligned.

f Other factors being equal, closed loop operation rather than the open loop operation is to be selected.

Figure 6:
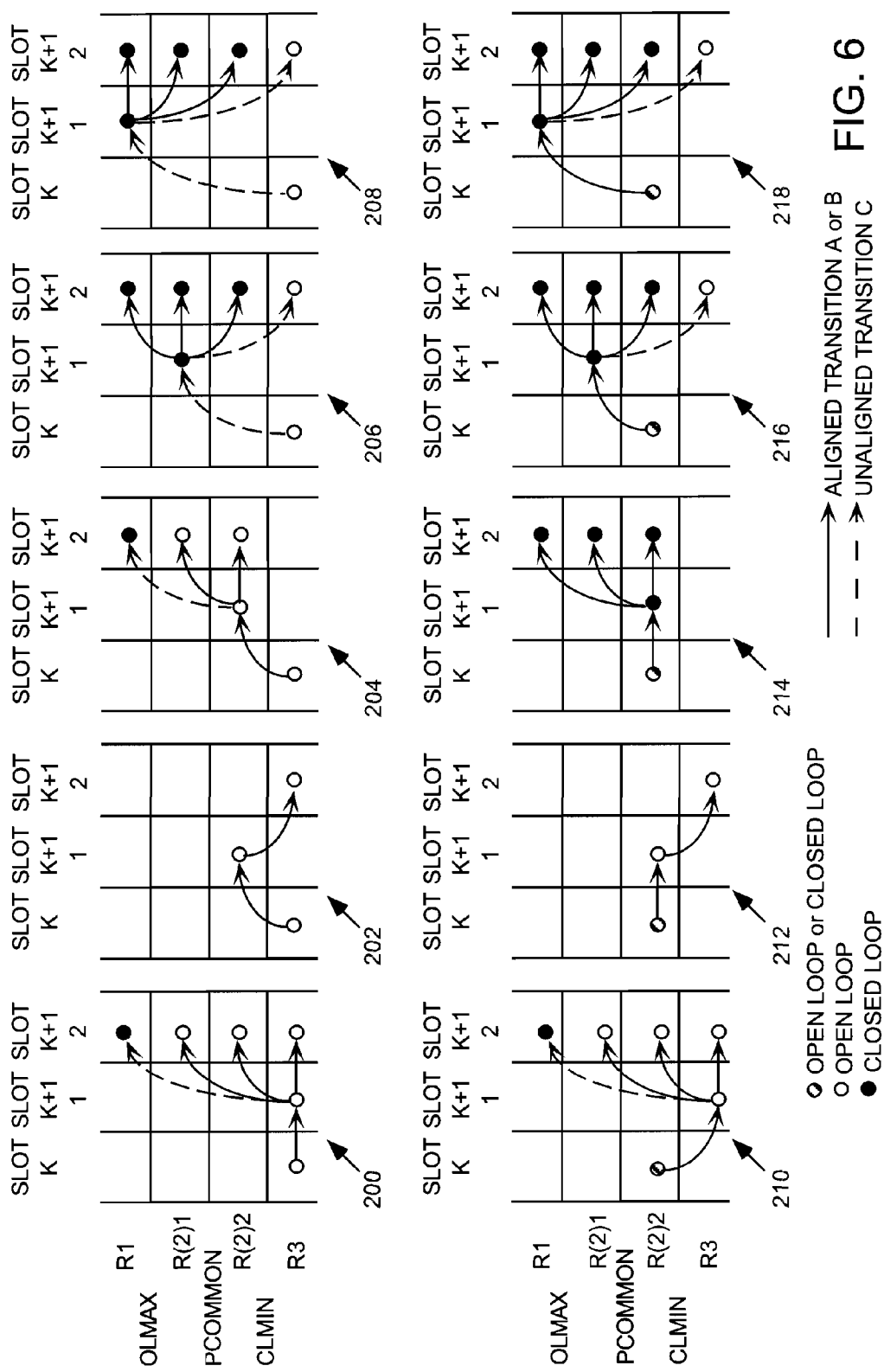
FIGS. 6 and 7 are diagrams showing possible transitions for the alternative operations of the user equipment, according to embodiments of the present disclosure.
Figure 7:
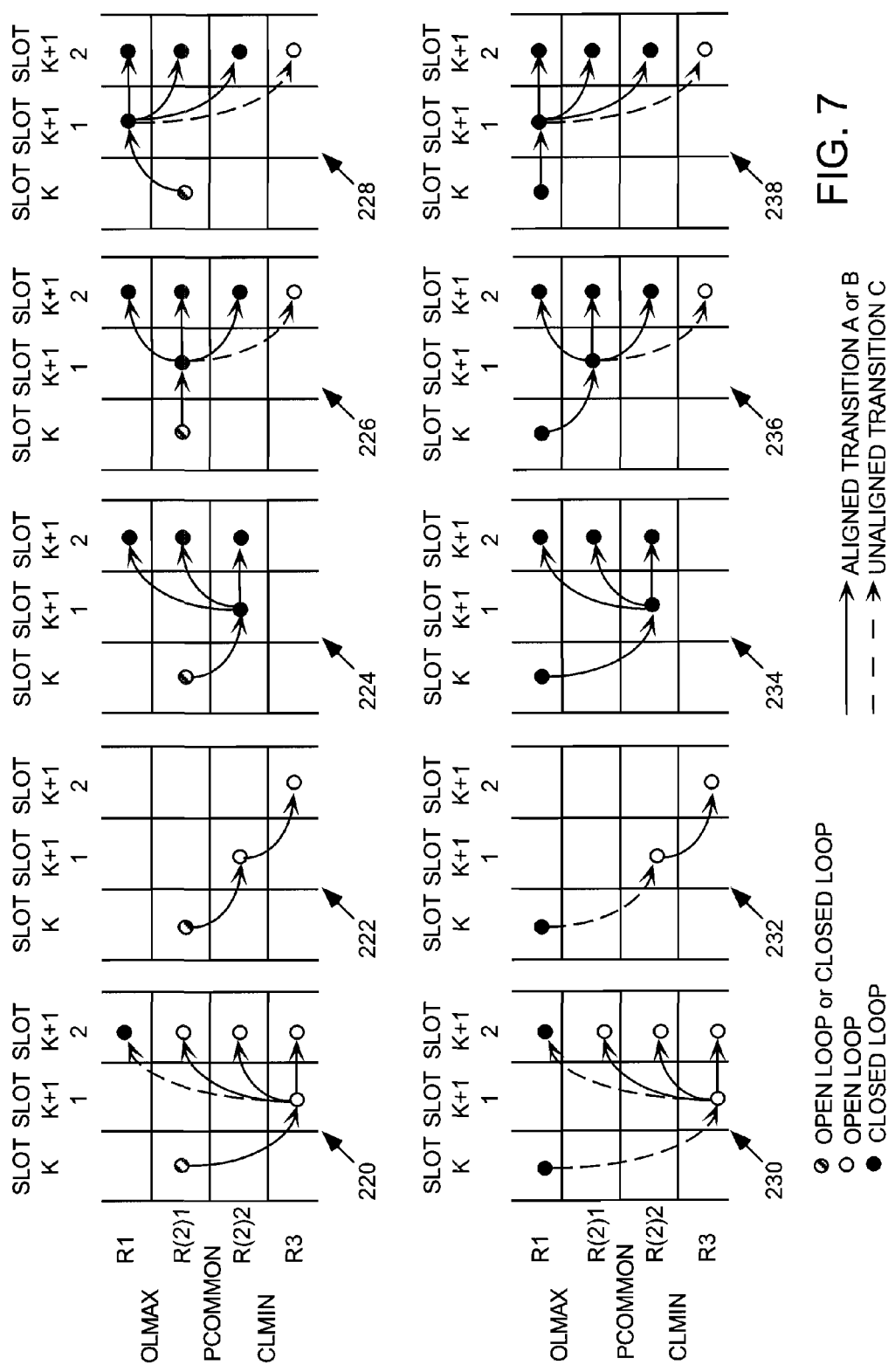

FIGS. 6 and 7 are diagrams showing possible transitions for the alternative operations of UE 20, described above with reference to FIG. 4, according to embodiments of the present disclosure. (FIG. 6 considers cases where initially power P<PCOMMON; FIG. 7 considers cases where initially power P>PCOMMON.) The transitions and mode of loop operation illustrated in the figures are generated using conditions a-f above. Diagrams 200, 202, 204, 206, and 208 show transitions and power control loop modes where the power output in current timeslot k is in region R3; diagrams 210, 212, 214, 216, and 218 show transitions and power control loop modes where the power output in timeslot k is in region R2(2); diagrams 220, 222, 224, 226, and 228 show transitions and power control loop modes where the power output in timeslot k is in region R2(1); and diagrams 230, 232, 234, 236, and 238 show transitions and power control loop modes where the power output in timeslot k is in region R1.

In the figures, the transitions between the regions are differentiated as aligned transitions A or B, or as unaligned transitions C. The power control loop modes are classified as open loop, closed loop, or open or closed loop.

Diagram 200 shows ordered triples (R3, R3, Ra), where a∈{1, 2(1), 2(2), 3}. For all triples the first transition, R3→R3 is a transition A. (Since the initial and final regions of the transition are R3, only open loop operation is valid for both regions, and there is no switch between loops used.) The second transition comprises one of R3→R3; R3→R(2)2; R3→R(2)1 which are all transitions A. Transition R3→R(2)1 is set as aligned because of condition e (previously discussed above with reference to FIG. 5), and to simplify flowcharts described below with reference to FIGS. 8 and 9. Alternatively the second transition is R3→R1. This is a non-aligned transition C, because of condition d, and requires a switch from open loop to closed loop operation.

Diagrams 210, 220, and 230 show similar second transitions and loop states to those of diagram 200, and the reasons given for these transitions and loop states in diagram 200 apply. First transitions R(2)1→R3 and R(2)2→R3 are aligned transitions B, because of condition b. First transition R1→R3 is a non-aligned transition (condition d).

The transitions of diagrams 208, 218, 228, and 238 are respectively "mirrors" about PCOMMON of the transitions of diagrams 230, 220, 210, and 200. Similar reasoning to that given above for diagrams 200, 210, 220, and 230 applies to diagrams 208, 218, 228, and 238, so that in the latter set of diagrams closed loop operation replaces open loop operation, and vice versa.

Pairs of diagrams 212 and 214 show triples (R2(2), R2(2), Ra), where a∈{1, 2(1), 2(2), 3}. The separation into two diagrams illustrates the effect of considering the power level region in interval (k+1, 2) when deciding the modes of loop operation that are to be implemented in the transitions of the triples. Because the second transition in diagram 212 is to region R3, which uses open loop operation, the transition cannot be non-aligned (condition c). Thus the loop in interval (k+1, 1) (region R(2)2) also has to be open loop, causing the first transition to be a transition B (condition b). In summary, because of the requirement that the final region of the second transition is open loop, the first transition also completes as an open loop.

This latter property is in contrast to the triples shown in diagram 214. In these cases the power levels in interval (k+1, 2) are in regions R(2)2, R(2)1, or R3. The loop for the latter case has to be closed. While the loops in the former cases are open or closed, condition f applies. Thus, while the first transition is still a transition B, in the cases illustrated in diagram 214 the first transition completes as a closed loop.

Diagram pair 222 and 224, and diagram pair 232 and 234, have the same second transitions as pair of diagrams 212 and 214. Pair 222 and 224, and pair 232 and 234 differ from pair 212 and 214 only in their first transitions. The first transitions for diagrams 222 and 224 are transitions B (condition b), respectively ending in open loop and closed loop operation. Because of condition c, the first transition for diagram 232 is a non-aligned transition C, ending in an open loop, to correspond with the open loop requirement of interval (k+1, 2). Because of conditions a, e, and the first transition for diagram 234 is an aligned transition A, ending in a closed loop, to correspond with the closed loop requirement of interval (k+1, 2).

Diagrams 202 and 204 both have the same first transition, which because of condition c must complete as an open loop. Except for the second transition (in diagram 204) to R1 which completes as a closed loop, the other second transitions must all complete as open loops (condition c).

Diagrams 206, 216, 226, and 236 have the same second transitions in timeslot k+1, from an initial region R(2)1. By applying condition f, and to simplify the flowcharts of FIGS. 8 and 9, the initial region of the second transitions is set to operate in closed loop. Except for the second transition completing in R3 (which must end as an open loop), the transitions are all aligned and end as closed loops.

The first transitions are all aligned, except for first transition R3→R(2)1 which must be non-aligned (condition c).

For certain transitions, different loops from those given in FIGS. 6 and 7 could be chosen. For example, in diagram 206 the transitions R3→R(2)1 followed by R(2)1→R3 could both be set to be aligned, causing the loop in R(2)1 to be open (and necessitating a separate diagram). Other variations on the loops given in FIGS. 6 and 7 will be apparent to those having skill in the art. Where such variations are possible, the loops have been chosen by way of example, and to simplify flowcharts.

Figure 8:
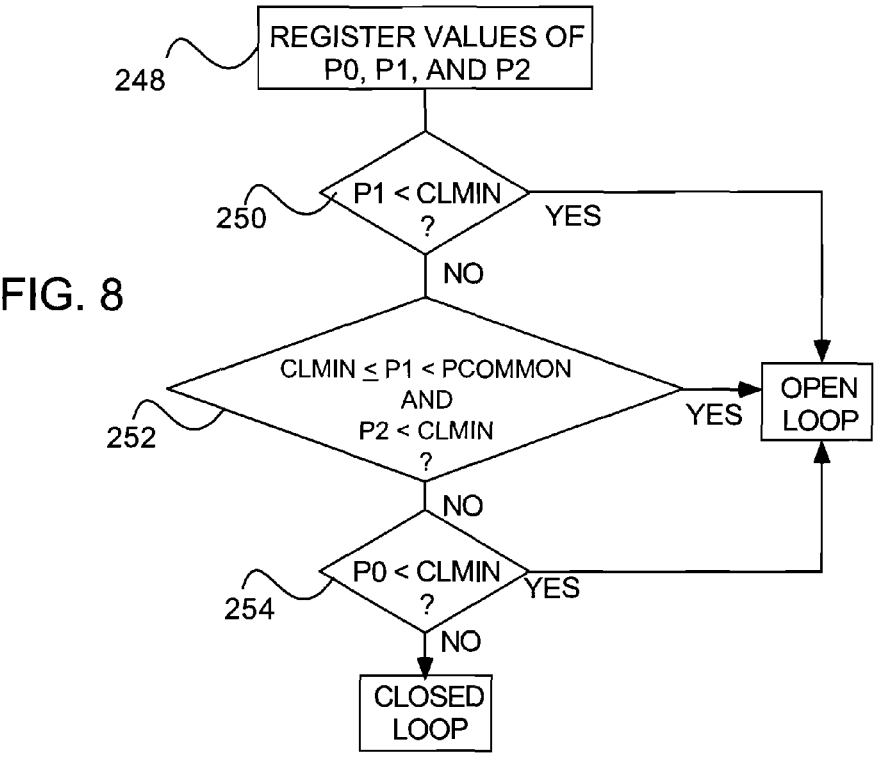
FIG. 8 is a flowchart to determine in which power control loop mode in a first interval of a timeslot the user equipment is to operate, according to an embodiment of the present disclosure.

FIG. 8 is a flowchart of a process used by processing module 30 to determine in which power control loop mode, in first interval (k+1, 1), the UE is to operate, according to an embodiment of the present disclosure. In an embodiment, first interval (k+1, 1) corresponds to a subsequent interval in a subsequent timeslot k+1 immediately following a current timeslot k. The results generated by the flowchart correspond to the open loop or closed loop results illustrated in the diagrams of FIGS. 6 and 7.

According to an embodiment, in 248, the processing module registers the values of (i) current power output in timeslot k, P0 (the measured output in timeslot k); (ii) the requested power output derived from PUR1 in first interval (k+1, 1), P1; and (iii) the requested power output derived from PUR2 in second interval (k+1, 2), P2 (the values of P1, and P2 are the requested outputs for the two intervals). As is described below, the processing module uses values P0, P1, and P2 to determine if the open loop or the closed loop is to be used in first interval (k+1, 1).

In a first condition 250, the processing module checks if P1 is in region R3. If condition 250 is true, then the open loop is selected by power control mode selector 33 for power control in the first interval (k+1, 1), corresponding to diagrams 200, 210, 220, 230.

If first condition 250 is not true, then in a second condition 252 the processing module checks if P1 is in region R2(2) and if P2 is in region R3. If the second condition is true, the open loop is selected by selector 33 for power control in the first interval (k+1, 1), corresponding to diagrams 202, 212, 222, 232.

If second condition 252 is also not true, then the processing module applies a third condition 254, and checks whether P0 is in region R3. If condition 254 is true, the open loop is selected by selector 33 for power control in the first interval (k+1, 1), corresponding to diagram 204. If third condition 254 is not true, then the closed loop is selected by selector 33 for power control in the first interval (k+1, 1), corresponding to diagrams 214-238 (excluding diagrams 220, 222, 230, and 232).

Figure 9:
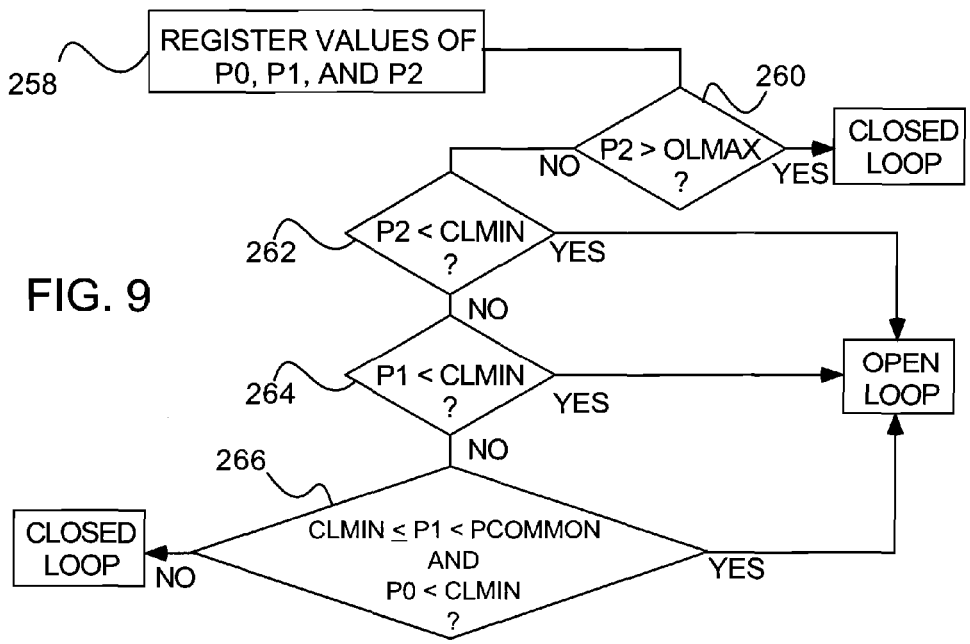
FIG. 9 is a flowchart to determine in which power control loop mode in a second interval of the timeslot the user equipment is to operate, according to an embodiment of the present disclosure.

FIG. 9 is a flowchart of a process used by processing module 30 in determining in which power control loop mode the UE is to operate, in second interval (k+1, 2), according to an embodiment of the present disclosure. The results generated by the process of the flowchart of FIG. 9 correspond to the open loop or closed loop power control results illustrated in the diagrams of FIGS. 6 and 7, for interval (k+1, 2).

According to an embodiment, in 258, in a process generally similar to 248 described above, the processing module registers the values of P0, P1, and P2.

In a first condition 260, the processing module checks if P2, to be used by the UE in interval (k+1, 2), is in region R1. If condition 260 is true, i.e., if P2>OLMAX, then the closed loop power control mode is selected by selector 33 in interval (k+1, 2), corresponding to R1 portions of all diagrams except 202, 212, 222, and 232.

If condition 260 is not true, in a second condition at 262 the processing module checks whether P2 is in region R3. If condition 262 is true, then the open loop power control mode is selected by selector 33, corresponding to R3 portions of interval (k+1, 2) of all diagrams except 204, 214, 224, and 234.

If second condition 262 is not true, in a third condition at 264 the processing module checks whether P1 is in region R3. If condition 264 is true, then the open loop power control mode is selected by selector 33, corresponding to R(2)1 and R(2)2 portions of interval (k+1, 2) of diagrams 200, 210, 220, and 230.

If third condition 264 is not true, then in a final condition 266, the processing module checks if P0 is in region R3, and if P1 is in region R2(2).

If the final condition is true then the open loop is used, corresponding to R(2)1 and R(2)2 portions of diagram 204. If the final condition is not true, the closed loop is selected by selector 33, corresponding to the remaining portions of all the diagrams.

It is noted that the flowcharts of FIGS. 8 and 9 are one method for deriving the power control loop mode, open or closed loop, to be used in an interval of a timeslot, and that other methods could be generated. Such methods proceed according to a flow different from the examples illustrated in FIGS. 8 and 9.

It is noted that in an embodiment the process flow is embodied in a reference look up table 48 (FIG. 1) that is generated giving a one-one correspondence between the ordered region triples illustrated in FIGS. 6 and 7 and an ordered pair of the power control loop mode to be used in the intervals. Corresponding to the 64 different transitions of FIGS. 6 and 7, there are 64 ordered triples of regions for the time intervals k, (k+1, 1), and (k+1, 2). Taking the ordered region triple (R2(2), R2(1), R3) as an example (diagram 216), the corresponding ordered pair of loops for intervals (k+1, 1) and (k+1, 2) is (closed loop, open loop). Processing module 30 typically accesses look up table 48 using the values of P0, P1, and P2 to determine the appropriate ordered region triple.

It is noted that the embodiments described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

We claim:

1. A method for power control, comprising:
   determining a need in a transmitter to perform a first output power update and then a second output power update after the first output power update;
   selecting a first power control mode for the first output power update and a second power control mode for the second output power update prior to performing the first output power update; said first power control mode and second power control mode being selected from one of a closed loop power control mode and an open loop power control mode, wherein the selection of the first power control mode and of the second power control mode is based on a function of a current output power, a first power to be applied at the first output power update, and a second power to be applied at the second output power update; and
   performing the first output power update using the first power control mode, and then performing the second output power update using the second power control mode, without measuring a power level applied in response to performing the first output power update.

2. The method according to claim 1, comprising configuring the transmitter to transmit signals in defined timeslots, wherein determining the need comprises determining the need in an initial timeslot and dividing a subsequent timeslot into a first interval and a second interval.

3. The method according to claim 2, wherein configuring the transmitter to operate in the defined timeslots comprises defining the timeslots pursuant to a Wideband Code Division Multiple Access (WCDMA) standard.

4. The method according to claim 1, comprising configuring the transmitter to transmit at a current power in the first power control mode and to transmit subsequently at the first power in the first power control mode, wherein the current power and the first power meet a transmitter power difference tolerance defined by a Wideband Code Division Multiple Access (WCDMA) standard, and wherein the first power control mode comprises one of the closed loop power control mode and the open loop power control mode.

5. The method according to claim 1, wherein selecting the first power control mode and the second power control mode comprises determining that a difference between the first power and the second power is less than a selected threshold, and setting, in response to the difference, the first power control mode and the second power control mode to mutually match each other.

6. The method according to claim 1, wherein selecting the first power control mode and the second power control mode comprises determining that a difference between the first power and the second power is greater than or equal to a selected threshold, and setting, in response to the difference, the first power control mode and the second power control mode to match.

7. The method according to claim 1, wherein determining the need comprises dividing a power region wherein the transmitter is configured to transmit in the open and closed loop power control modes into power sub-regions, and defining a boundary of one of the sub-regions in response to boundaries of the power region.

8. The method according to claim 1, comprising implementing the function as one or more processes defined by respective one or more predefined flowcharts.

9. The method according to claim 1, comprising implementing the function as a reference look up table including ordered triples of power outputs in a one to one correspondence with ordered pairs of control modes.

10. A power control module for a transmitter, comprising:
a processing module which is configured to determine a need for the transmitter to perform a first output transmit power update and then perform a second output transmit power update after the first output transmit power update; and
a power control mode selector that is configured to:
select a first power control mode for the first output transmit power update and select a second power control mode for the second output transmit power update prior to performing the first output power update,
select the first power control mode and select the second power control mode from one of a closed loop power control mode and an open loop power control mode, and
select the first power control mode and the second power control mode respectively based on a function of a current output power of the transmitter, a first power to be applied at the first output power update, and a second power to be applied at the second output power update.

11. The module according to claim 10, wherein the processing module is configured to perform the first output power update using the first power control mode, and then perform the second output power update using the second power control mode, without measuring a power level applied in response to performing the first output power update.

12. The module according to claim 10, wherein the transmitter is configured to operate in defined timeslots, and wherein the processing module is configured to determine the need in an initial timeslot and divide a subsequent timeslot into a first and a second interval.

13. The module according to claim 10, wherein the transmitter is configured to transmit at a current power in the first power control mode and to transmit subsequently at the first power in the first power control mode, wherein the current power and the first power meet a transmitter power difference tolerance defined by a Wideband Code Division Multiple Access (WCDMA) standard, and wherein the first power control mode comprises one of the closed loop power control mode and the open loop power control mode.

14. The module according to claim 10, wherein the power control mode selector is configured to determine that a difference between the first power and the second power is less than a selected threshold, and to set, in response to the difference, the first power control mode and the second power control mode to match.

15. The module according to claim 10, wherein the power control mode selector is configured to determine that a difference between the first power and the second power is greater than or equal to a selected threshold, and to set, in response to the difference, the first power control mode and the second power control mode to mutually match each other.

16. The module according to claim 10, wherein the processing module is configured to divide a power region wherein the transmitter is configured to transmit in the open and closed loop power control modes into power sub-regions, and to define a boundary of one of the sub-regions in response to boundaries of the power region.

17. The module according to claim 10, wherein the power control mode selector is configured to implement the function as one or more processes defined by respective one or more predefined flowcharts.

18. The module according to claim 10, wherein the power control mode selector is configured to implement the function as a reference look up table comprising ordered triples of power outputs in a one to one correspondence with ordered pairs of control modes.

19. User equipment, comprising:
a transmitter; and
the power control module claimed in claim 10.

20. The module according to claim 10, wherein the processing module and the power control mode selector are implemented in a transmitter chipset.

* * * * *